(12) United States Patent
Yuan et al.

(10) Patent No.: US 9,639,650 B2
(45) Date of Patent: May 2, 2017

(54) METHOD, APPARATUS, AND SYSTEM FOR OFFSET METAL POWER RAIL FOR CELL DESIGN

(71) Applicant: GLOBALFOUNDRIES Inc., Grand Cayman (KY)

(72) Inventors: Lei Yuan, Cupertino, CA (US); Juhan Kim, Sunnyvale, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 22 days.

(21) Appl. No.: 14/716,565

(22) Filed: May 19, 2015

(65) Prior Publication Data

US 2016/0342726 A1 Nov. 24, 2016

(51) Int. Cl.
*G06F 17/50* (2006.01)
*H01L 21/00* (2006.01)
*H01L 21/027* (2006.01)

(52) U.S. Cl.
CPC ...... *G06F 17/5077* (2013.01); *G06F 17/5068* (2013.01); *H01L 21/027* (2013.01); *G06F 17/5072* (2013.01); *G06F 17/5081* (2013.01); *G06F 2217/12* (2013.01)

(58) Field of Classification Search
CPC ............. G06F 17/5081; G06F 17/5077; G06F 17/5072; G06F 17/5068; G06F 2217/12; H01L 21/027
USPC ....... 716/119, 122, 123, 124, 125, 129, 130, 716/131
See application file for complete search history.

(56) References Cited

U.S. PATENT DOCUMENTS

| | | | | |
|---|---|---|---|---|
| 5,668,389 A * | 9/1997 | Jassowski | ........... | H01L 23/5286 257/207 |
| 8,004,014 B2 * | 8/2011 | Ikegami | .............. | H01L 27/0207 257/202 |
| 2007/0240084 A1 * | 10/2007 | Bonges | ............... | G06F 17/5068 257/773 |
| 2008/0111158 A1 * | 5/2008 | Sherlekar | ............ | G06F 17/5072 257/207 |
| 2008/0178135 A1 * | 7/2008 | Wu | ...................... | G06F 17/5068 257/798 |

* cited by examiner

Primary Examiner — Phallaka Kik
(74) Attorney, Agent, or Firm — Williams Morgan, P.C.

(57) ABSTRACT

At least one method, apparatus and system disclosed involves circuit layout for an integrated circuit device comprising an asymmetrically placed metal formation. A design for an integrated circuit device is received. The design comprises at least one functional cell. A first metal formation is placed asymmetrically about a first cell boundary of the functional cell for providing additional space for routing.

20 Claims, 8 Drawing Sheets

METHOD, APPARATUS, AND SYSTEM FOR OFFSET METAL POWER RAIL FOR CELL DESIGN

BACKGROUND OF THE INVENTION

Field of the Invention

Generally, the present disclosure relates to the manufacture of sophisticated semiconductor devices, and, more specifically, to various methods and structures for using offset metal power rails for improved standard cells for improved cell routability for manufacturing semiconductor devices.

Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as exposure tool or a stepper. As an example, an etch process may be performed on the semiconductor wafers to shape objects on the semiconductor wafer, such as polysilicon lines, each of which may function as a gate electrode for a transistor. As another example, a plurality of metal lines, e.g., aluminum or copper, may be formed that serve as conductive lines that connect one conductive region on the semiconductor wafer to another.

In this manner, integrated circuit chips may be fabricated. In some cases, integrated circuit or chips may comprise various devices that work together based upon a hard-coded program. For example, application-specific integrated circuit (ASIC) chips may use a hard-coded program for various operations, e.g., boot up and configuration processes. The program code, in the form of binary data, is hard-coded into the integrated circuit chips.

When designing a layout of various devices with an integrated circuits (e.g., CMOS logic architecture), designers often select pre-designed functional cells comprising various features (e.g., diffusion regions, transistors, metal lines, vias, etc.) and place them strategically to provide an active area of an integrated circuit. One challenge of designing a layout is accommodating ever-increasing density of cell components and still maintain routability for connecting various components of the cells. This is increasingly a challenge as dimensions of these components get smaller, such as for 10 nm or lower integrated circuit designs.

The pre-designed functional cells are often used to design transistors, such as metal oxide field effect transistors (MOSFETs or FETs). A FET is a device that typically includes a source region, a drain region, a channel region that is positioned between the source region and the drain region, and a gate electrode positioned above the channel region. Current flow through the FET is controlled by controlling the voltage applied to the gate electrode. If a voltage that is less than the threshold voltage of the device is applied to the gate electrode, then there is no current flow through the device (ignoring undesirable leakage currents, which are relatively small). However, when a voltage that is equal to or greater than the threshold voltage of the device is applied to the gate electrode, the channel region becomes conductive, and electrical current is permitted to flow between the source region and the drain region through the conductive channel region.

To improve the operating speed of FETs, and to increase the density of FETs on an integrated circuit device, device designers have greatly reduced the physical size of FETs over the years. More specifically, the channel length of FETs has been significantly decreased, which has resulted in improving the switching speed of FETs. However, decreasing the channel length of a FET also decreases the distance between the source region and the drain region. In some cases, this decrease in the separation between the source and the drain makes it difficult to efficiently inhibit the electrical potential of the channel from being adversely affected by the electrical potential of the drain. This is sometimes referred to as a so-called short channel effect, wherein the characteristic of the FET as an active switch is degraded.

There are essentially two types of FETs: planar FETs and so-called 3D devices, such as an illustrative finFET device, which is a 3-dimensional structure. More specifically, in a finFET, a generally vertically positioned, fin-shaped active area is formed and a gate electrode encloses both of the sides and the upper surface of the fin-shaped active area to form a trigate structure so as to use a channel having a 3-dimensional structure instead of a planar structure. In some cases, an insulating cap layer, e.g., silicon nitride, is positioned at the top of the fin and the finFET device only has a dual-gate structure.

FinFET designs use "fins" that may be formed on the surface of a semiconductor wafer using selective-etching processes. The fins may be used to form a raised channel between the gate and the source and drain of a transistor. The gate is then deposited such that it wraps around the fin to form a frigate structure. Since the channel is extremely thin, the gate would generally have a greater control over the carriers within. However, when the transistor is switched on, the shape of the channel may limit the current flow. Therefore, multiple fins may be used in parallel to provide greater current flow for increased drive strength.

FIG. 1 illustrates a stylized cross-sectional depiction of a state-of-the-art finFET device. A finFET device 100 illustrated in FIG. 1 comprises a plurality of "fins" 110. The semiconductor device may be position to a vertical orientation, creating one or more fins 110. The source and drain of the finFET are placed horizontally along the fin. A high-k metal gate 120 wraps over the fin, covering it on three sides. The gate 120 defines the length of the finFET device. The current flow occurs along an orthogonal crystal plane in a direction parallel to the plane of the semiconductor wafer. The electrically significant height of the fin (labeled H) is typically determined by the amount of oxide recess in the fin reveal step and hence is constant for all fins 110.

The thickness of the fin (labeled $T_{fi}$) determines the short channel behavior of the transistor device and is usually small in comparison with the height H of the fin 110. The pitch (labeled P) of the fins is determined by lithographic constraints and dictates the wafer area to implement the desired device width. A small value of the pitch P and a large value of the height H enable a better packing of the devices per square area resulting in a denser design, or more efficient use of silicon wafer area.

The scaling down of integrated circuits coupled with higher performance requirements for these circuits have prompted an increased interest in finFETs. FinFETs generally have the increased channel widths, which includes channel portions formed on the sidewalls and top portions of the fins. Since drive currents of the finFETs are proportional to the channel widths, finFETs generally display increase drive current capabilities.

The ultimate goal in integrated circuit fabrication is to accurately reproduce the original circuit design on integrated circuit products. Historically, the feature sizes and pitches employed in integrated circuit products were such that a desired pattern could be formed using a single patterned photoresist masking layer. However, in recent years, device dimensions and pitches have been reduced to the point where existing photolithography tools, e.g., 193 nm wavelength immersion photolithography tools, cannot form a single patterned mask layer with all of the features of the overall target pattern. Accordingly, device designers have resorted to techniques that involve performing multiple exposures to define a single target pattern in a layer of material. One such technique is generally referred to as multiple patterning, e.g., double patterning. Generally speaking, double patterning is an exposure method that involves splitting (i.e., dividing or separating) a dense overall target circuit pattern into two separate, less-dense patterns. The simplified, less-dense patterns are then printed separately on a wafer utilizing two separate masks (where one of the masks is utilized to image one of the less-dense patterns, and the other mask is utilized to image the other less-dense pattern). Further, in some cases, the second pattern is printed in between the lines of the first pattern such that the imaged wafer has, for example, a feature pitch which is half that found on either of the two less-dense masks. This technique effectively lowers the complexity of the photolithography process, improving the achievable resolution and enabling the printing of far smaller features than would otherwise be impossible using existing photolithography tools.

The Self-Aligned-Double-Patterning (SADP) process is one such multiple patterning technique. The SADP process may be an attractive solution for manufacturing next-generation devices, particularly metal routing lines on such next-generation devices, due to better overlay control that is possible when using an SADP process. In SADP processes, metal features that are defined by mandrel patterns are referred to as "mandrel metal," while metal feature that are not defined by mandrel patterns are called "non-mandrel metal." Further, SADP processes generally have a high tolerance for overlay errors. Therefore, SADP processes have been increasingly adopted for metal formation in higher resolution designs, such as 10 nm designs.

Another example of multiple pattern techniques is the lithography-etch-lithography-etch (LELE) process, which generally involves creating the ultimate or desired target pattern in a hard mask material by performing two lithography and two etch processes. In an LELE double patterning process, a first photoresist layer is formed above a hard mask layer. Thereafter, the first photoresist layer is exposed during a first exposure process and subsequently developed to define a first patterned photoresist mask. Next, an etching process is performed through the first patterned photoresist mask on the hard mask layer to transfer the pattern in the first patterned photoresist mask to the hard mask layer. The first patterned photoresist mask is then removed from the now partially patterned hard mask layer. Next, a second photoresist layer is formed above the partially patterned hard mask layer. The second photoresist layer is then exposed during a second exposure process (using a different reticle) and subsequently developed to define a second patterned photoresist mask. An etching process is then performed through the second patterned photoresist mask on the partially patterned hard mask layer to transfer the pattern in the second patterned photoresist mask to the partially patterned hard mask layer. This latter etching process results in a final patterned hard mask layer having the desired target pattern. The second patterned photoresist mask is then removed. The final patterned hard mask layer may then be used to pattern an underlying layer of material.

To use double patterning techniques, an overall target pattern must be what is referred to as double-patterning-compliant. In general, this means that an overall target pattern is capable of being decomposed into two separate patterns that each may be printed in a single layer using existing photolithography tools. Layout designers sometime speak of such patterns with reference to "colors," wherein the first mask will be represented in an EDA tool using a first color and the second mask will be represented in the EDA tool using a second, different color. To the extent a layout is non-double-patterning-complaint, it is sometimes stated to present a "coloring conflict" between the two masks.

Designers often use pre-designed basic cells to form layouts of more complex cells comprising finFET devices. One example of a typical pre-designed functional cell is illustrated in FIG. 2. FIG. 2 illustrates a typical standard cell 200 for a 10 nm node design. Since there is a strong industry demand for dense standard cell library, designers have implemented cell libraries of less than 9-tracks (9 T), such as 10 nm, 8.75 T libraries. The cell 200 is an example of a multi-track 10 nm, 8.75 T cell, which may comprise a plurality of components that densely populate the cell 200. The cell 200 comprises a plurality of metal pins (230a-230c) (e.g., Metal-1 (M1) metal pins. The six metal pins 130a-130f are input pins. The cell 200 also includes an output "U-shaped" pin 220. The cell 200 includes a VDD metal formation 250 on a routing track 251, and a VSS metal formation 260 on another routing track 261.

In some examples, the metals pins 230A and 230B may be input pins, while the U-shaped pin 220 and the metal pin 230C may be output pins. Further, the cell 200 also includes a plurality of vertical semiconductor formations 270, e.g., gate formations for a transistor. A plurality of pin hit point 275 provides for routing of M2 metal formations. At the boundary of the cell 200, the metal VDD line 250 and the metal VSS line 260 are defined. In light of the VDD line 250, the VSS line 260, the output pins 220, 230C, the utilization of metal-2 layer (M2) tracks 240 to connect the various pins 230A-230B can cause the cell 200 to become very difficult to connect. This causes routing-congestion and causes the routing task to be more difficult.

Since finFETs are being defined using the standard cells, such as the cell 200, a 3-dimensional height is defined for the cells 200. With regard to finFET technology, the cell height is generally associated with the fin pitch that results in non-integer or non-half integer number of metal pitches, e.g., 8.75 T libraries. Generally, uniform fin pitch is preferable to uniform metal pitch. Thus, the cell height has to generally confirm to a uniform standard based upon the fin pitch. For example, the cell height of a 48 nm cell would be 8.75 T multiplied by 48 nm, which is 420 nm. For ten fins, the fin pitch would be 420 nm divided by 10 fins, which is 42 nm. Further, the cell 200 has a 60 nm metal-1 layer (M1) power rail. In this manner, the cell 200 uses up a significant amount of real estate due to the width of the M1 VDD and VSS power rails.

Further, in the state-of-the-art, the metal-2 (M2) VDD and VSS power rails are often used to improve IR drop on power rails and thus improve circuit reliability. In the state-of-the-art, the M2 VDD and VSS power rails are symmetrically positioned about the cell boundary track, as illustrated in FIG. 3. FIG. 3 illustrates a stylized, simplified depiction of a portion of a cell 300 having metal-2 (M2) tracks and M2 power rails. In the example of FIG. 3, the M2 tracks on which the M2 power rails are formed overlaps with the cell boundaries 310, 320. Symmetrically about the 1$^{st}$ cell boundary 310 and M2 track, a non-mandrel metal M2 formation (350) is defined. Similarly, symmetrically about the 2$^{nd}$ cell boundary 320 and M2 track, a mandrel metal M2 formation (360) is defined.

The distance between the 1$^{st}$ cell boundary 310 and the top edge of the M2 metal 350 is "a," which is the same distance between the 1$^{st}$ cell boundary 310 and the bottom edge of the M2 metal 350. Similarly, between the 2$^{nd}$ cell boundary 320 and the top edge of the M2 metal 360 is "a," which is the same distance between the 2$^{nd}$ cell boundary 320 and the bottom edge of the M2 metal 360. The cell 300 includes a M2 routing tracks 340 that is 90 nm away from the 1$^{st}$ cell boundary 310, wherein the distance between the M2 tracks 340 is 48 nm.

FIG. 4 illustrates a stylized depiction of a typical grouped cell-pair including non-mandrel and mandrel boundary metal formations. The cell pair 400 comprises two cells that are grouped together, a 1$^{st}$ cell 401 and a 2$^{nd}$ cell 402. The cells 401, 402 are 10 nm, 8.75 T cells. Thus, on cell 401, there are eight horizontal tracks on which alternative mandrel and non-mandrel metal formations are defined.

A non-mandrel M2 metal formation 450 is defined symmetrically about a 1$^{st}$ boundary track 403. A mandrel M2 metal formation 460 is defined symmetrically about a 2$^{nd}$ boundary track 404. The non-mandrel power rail 450 and the mandrel power rail 460 are respectively coupled to VSS M1 power rail 455 and the VDD M1 power rail 465 using vias 490.

The non-mandrel M2 metal formation 450 followed by a mandrel M2 metal formation 485A, followed by a non-mandrel M2 metal 480A on the next track 440, followed by a mandrel M2 metal formation 485B on a subsequent track 440, followed by a non-mandrel M2 metal 480B, followed by a mandrel M2 metal 485C, and followed by a non-mandrel 480C. Finally, on the 2$^{nd}$ cell boundary 404, the wide mandrel M2 power rail 460 is defined symmetrically about the boundary 404, above a M1 power rail 465. Below the M2 power rail 460, on the next M2 track (in the 2$^{nd}$ cell 402), a non-mandrel M2 metal 480D is defined. In this manner, mandrel and non-mandrel M2 metal formations are alternated on the M2 tracks 440 and the cell boundaries 403, 404 in order to avoid color mismatch errors. For example, if instead of the non-mandrel metal 480D, a mandrel metal were defined, a color conflict error would occur.

Among the problems associated with the state-of-the-art includes the fact that the relatively large width of the power rails 450, 460 cause a reduction in one M2 routing track, which causes routing inefficiencies. Although the track grid on both sides of the cell boundary is larger than the default grid, there is insufficient space to insert an additional route track. That is, only six M2 routing tracks are available in each of the cells 401, 402. Even if various components of the cell pair 400 were to be reduced, the loss of the M2 routing track would not be overcome.

Other problems associated with the state-of-the-art includes the fact that wide M2 metal formations are required for both mandrel and non-mandrel metals (i.e., the power rails). This can cause poor mandrel printability on the top portion and the bottom portion of the cells. Further, the current designs of the cells 401, 403 cause the need for having M2 power rails to be of mandrel and non-mandrel metals. It would be more desirable to have design that comprises power rails that are all of mandrel metals. Further, it would be desirable to provide increased routing resources to efficiently route ever-increasing congestion of pre-defined cells. Therefore, as described above, there are various inefficiencies, errors, and other problems associated with the state-of-art.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for a circuit layout for an integrated circuit device comprising an asymmetrically placed metal formation. A design for an integrated circuit device is received. The design comprises at least one functional cell. A first metal formation is placed asymmetrically about a first cell boundary of the functional cell for providing additional space for routing.

BRIEF DESCRIPTION OF THE DRAWINGS

The disclosure may be understood by reference to the following description taken in conjunction with the accompanying drawings, in which like reference numerals identify like elements, and in which.

Figure 1:
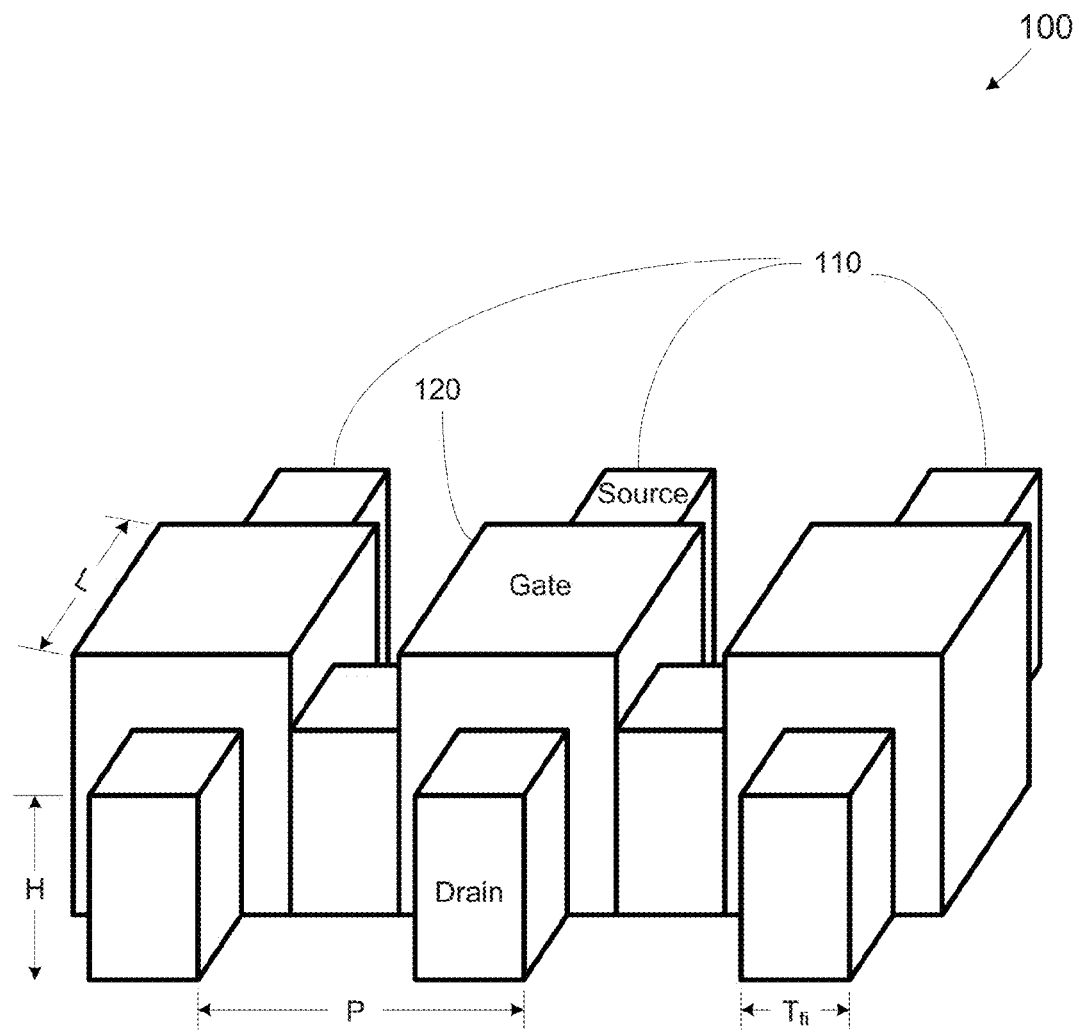
FIG. 1 illustrates a stylized cross-sectional depiction of a state-of-the-art finFET device.
Figure 2:
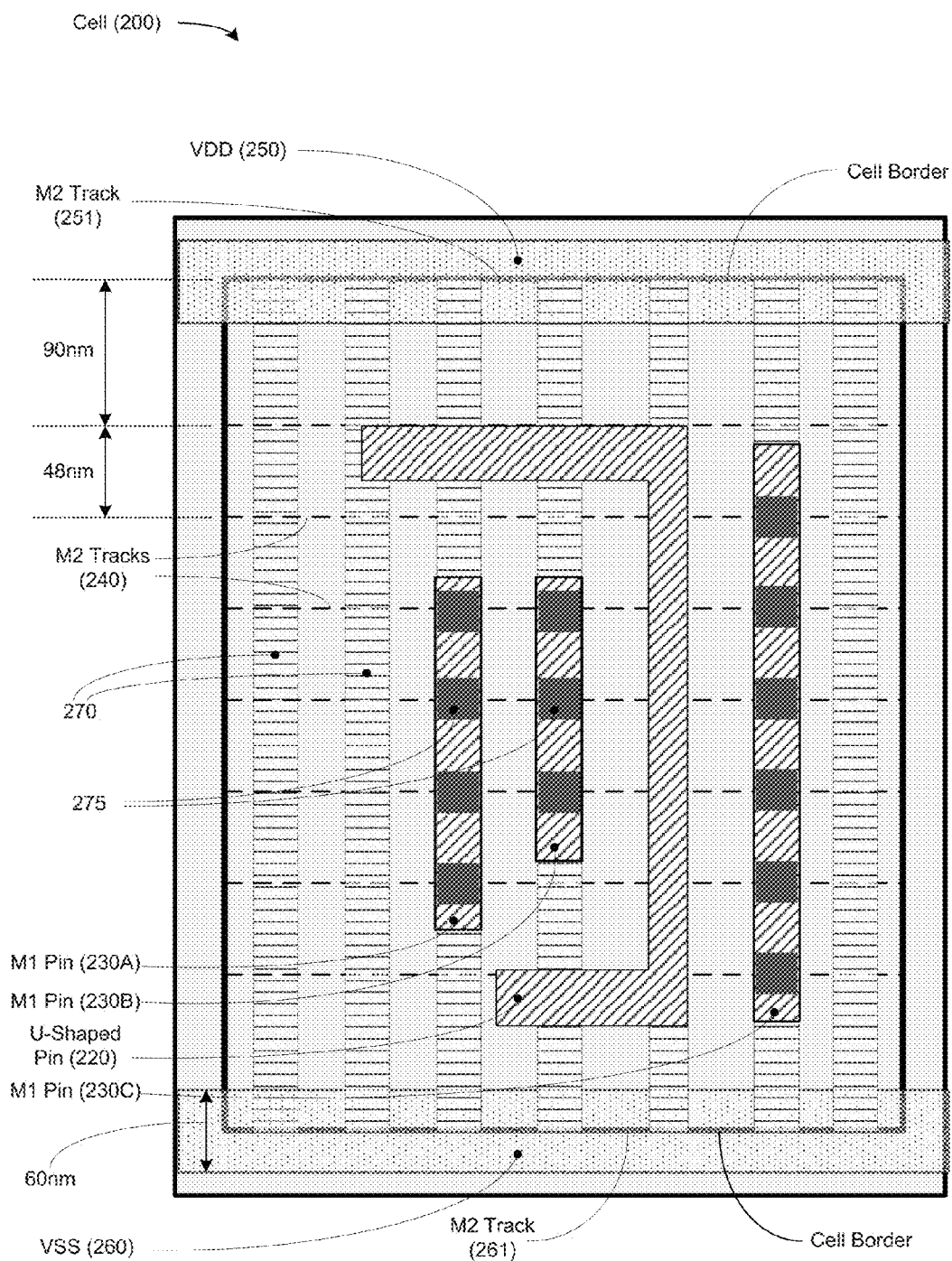
FIG. 2 illustrates a stylized depiction of a typical standard cell for a 10 nm node design.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for performing a standard cell design improvement for increasing routing efficiency. Embodiments herein provide for defining power rail metal formations (e.g., M2 metal formation) that are wider-than-default metal formation (e.g., >50 nm, such as 60 nm) in an offset or asymmetrical manner about the top and bottom boundaries of a functional cell. As a result of the offset or asymmetry provided by the design of embodiments herein, an additional route track may be provided. As a non-limiting example, for a 10 nm, 8.75 T standard cell library, a total of seven route tracks (compared to six in the prior art) may be provided.

At the cell boundaries, design of embodiments herein provide for the wider-than-default metal formations to be used as a power tap or as a routing resource. Further, in light of the additional routing track, embodiments herein provide for the wider-than-default metal formations to be mandrel metal formation, which is generally more desirable. Moreover, due to the offset of the power rails at the top and bottom of the cells and the fact that both power rails at the top and bottom are mandrel metals, improved mandrel printability at the top and bottom of the cell may be realized.

Figure 3:
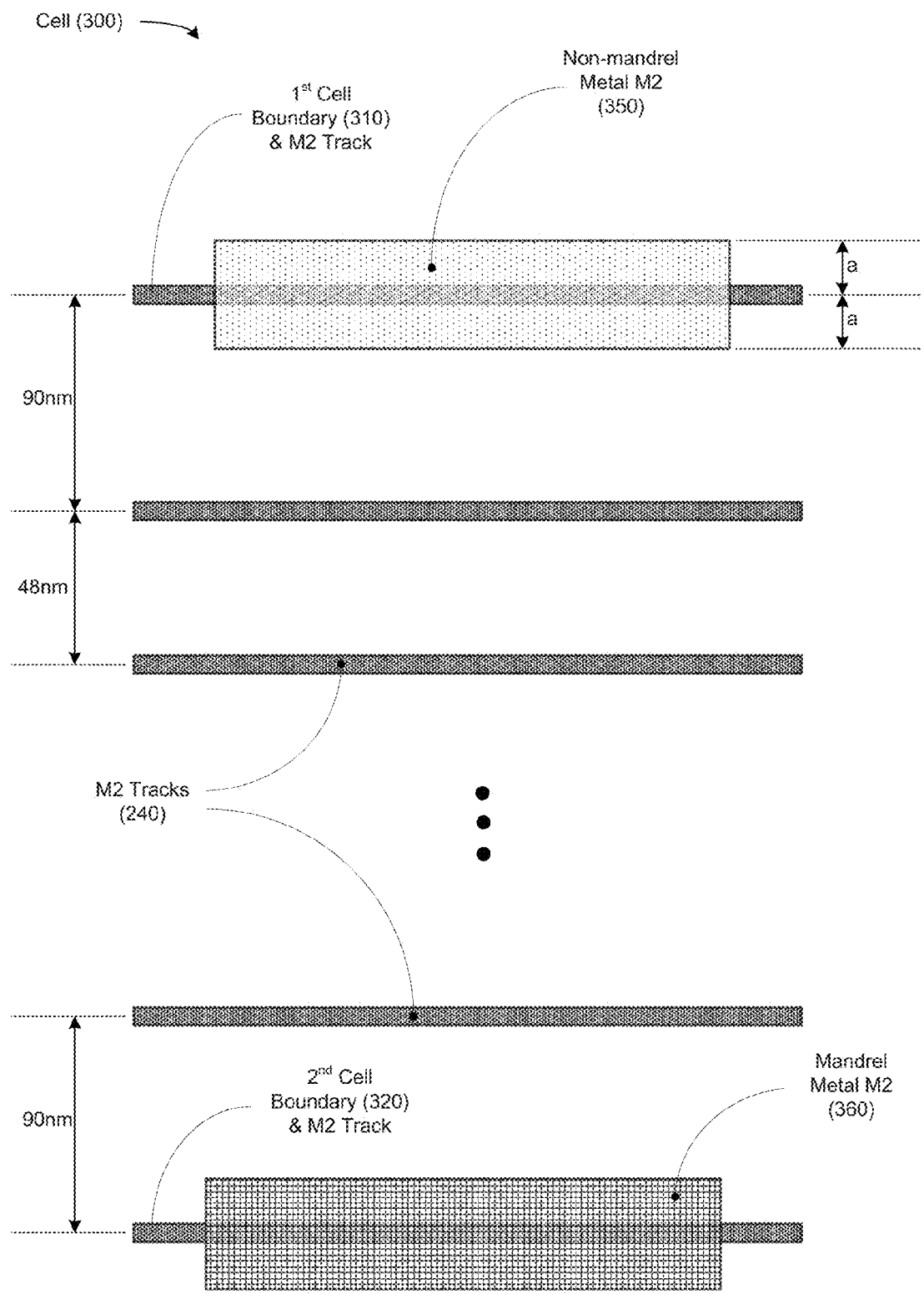
FIG. 3 illustrates a stylized, simplified depiction of a portion of a cell 300 having metal tracks and power rails.
Figure 4:
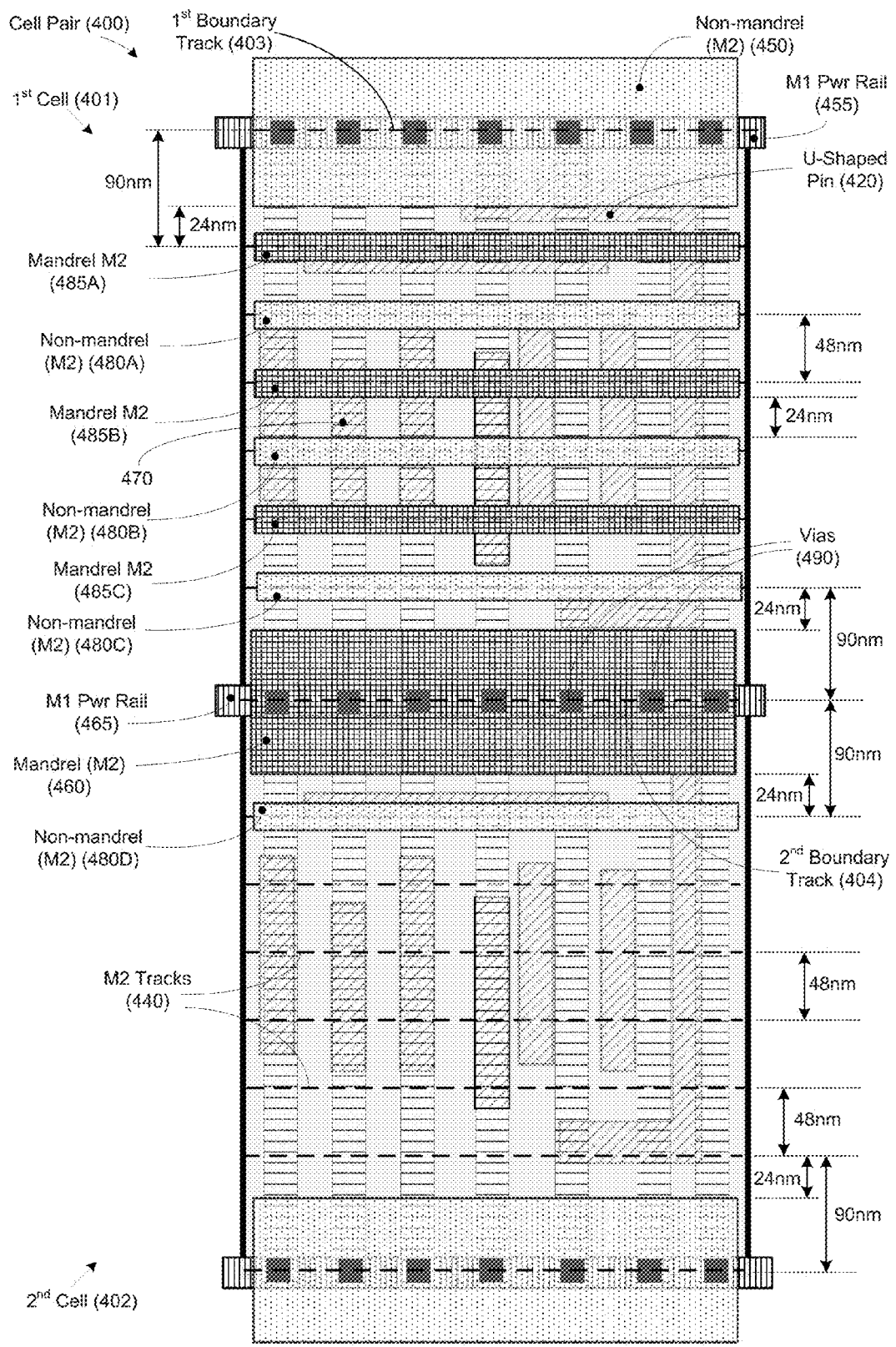
FIG. 4 illustrates a stylized depiction of a typical grouped cell-pair including non-mandrel and mandrel boundary metal formations.
Figure 5:
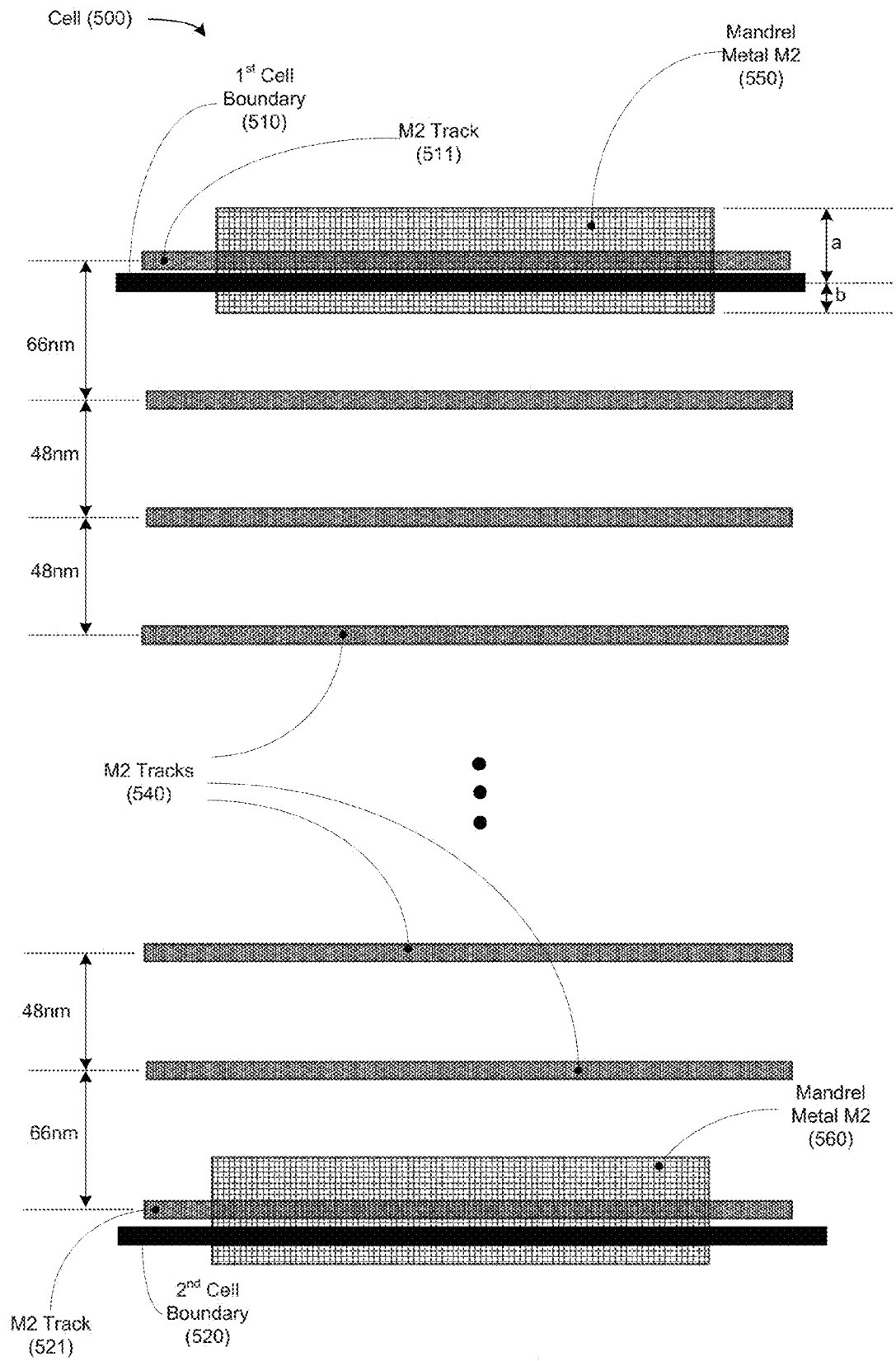
FIG. 5 stylized block diagram depiction of a functional cell layout comprising offset metal formation, in accordance with embodiments herein.

Turning now to FIG. 5, a stylized block diagram depiction of a functional cell layout comprising offset metal formation, in accordance with embodiments herein, is illustrated. As indicated above, in the state-of-the-art, the VDD and VSS power rails are symmetrically positioned about the cell boundary track (as illustrated in FIG. 3). In contrast, FIG. 5 depicts a cell 500 having power rails that are offset about a $1^{st}$ cell boundary 510 and a $2^{nd}$ cell boundary 520. Asymmetrically about the 1st cell boundary 510, a wider-than-default mandrel M2 metal formation (550) is defined. Similarly, asymmetrically about the 2nd cell boundary 520, a mandrel M2 metal formation (560) is defined. The M2 metal formations may be wider-than-default metal formations, e.g., 60 nm in a 10 nm, 8.75 T functional cell library. Although the mandrel metal formations 550 and 560 are asymmetrically positioned about the $1^{st}$ and $2^{nd}$ cell boundaries, they are respectively symmetrical to the M2 tracks 511 and 512. Continuing referring to FIG. 5, the distance between the 1st cell boundary 510 and the top edge of the M2 metal 550 is "a," which is a greater than the distance "b," which is the distance between the 1st cell boundary 510 and the bottom edge of the M2 metal 550. Similarly, between the 2nd cell boundary 520 and the top edge of the M2 metal 560 is "a," which is a greater distance than "b," which is the distance between the 2nd cell boundary 520 and the bottom edge of the M2 metal 560. In this manner, the M2 metal features 550 and 560 are respectively asymmetrical about the cell boundaries 510 and 520, but respectively symmetrical about the M2 tracks 511 and 521.

The cell 500 includes M2 routing tracks 540, the first of which is now a slightly larger distance (e.g., 66 nm) away from the routing track 511. For example, in a 10 nm, 8.75 T track cell, the distance between the routing track 511 and track to next adjacent track is 66 nm, but the distance between subsequent tracks (540) are 48 nm as a result of the offset of the M2 power rail 550. As such, a different color metal formation of a standard width (e.g., 24 nm) may be then defined on the adjacent track. The distance between all subsequent tracks 540 are 48 nm, and the distance between the bottom M2 track near the $2^{nd}$ cell boundary 520 is a slightly larger than the standard track width (e.g., 66 nm).

Similarly, as a result of the offset placement of the metal formation 560, the distance between the routing track 540 near the $2^{nd}$ cell boundary (bottom boundary) 520 and the bottom track 521 is slightly larger than a standard track distance (e.g., 66 nm). As such, a different color metal formation of a standard width (e.g., 24 nm) may be then defined on the track adjacent to the cell boundary.

The amount of offset/asymmetry may be adjusted and may depend on the amount of width required for the power rails, the standard track widths, the width of the standard metal formation, the space needed to generate the additional route track, the overlap distance between the offset M2 power rail and M1 power rail to form via connection, and/or the like. Therefore, the width amount of the "a" and "b" amounts may be adjusted based upon these factors. In some embodiments, an automated device, software, and/or firmware may automatically adjust the "a" and "b" amounts based upon the design parameters (e.g., 10 nm design, the number of fins, the track pitch, etc.).

Figure 6:
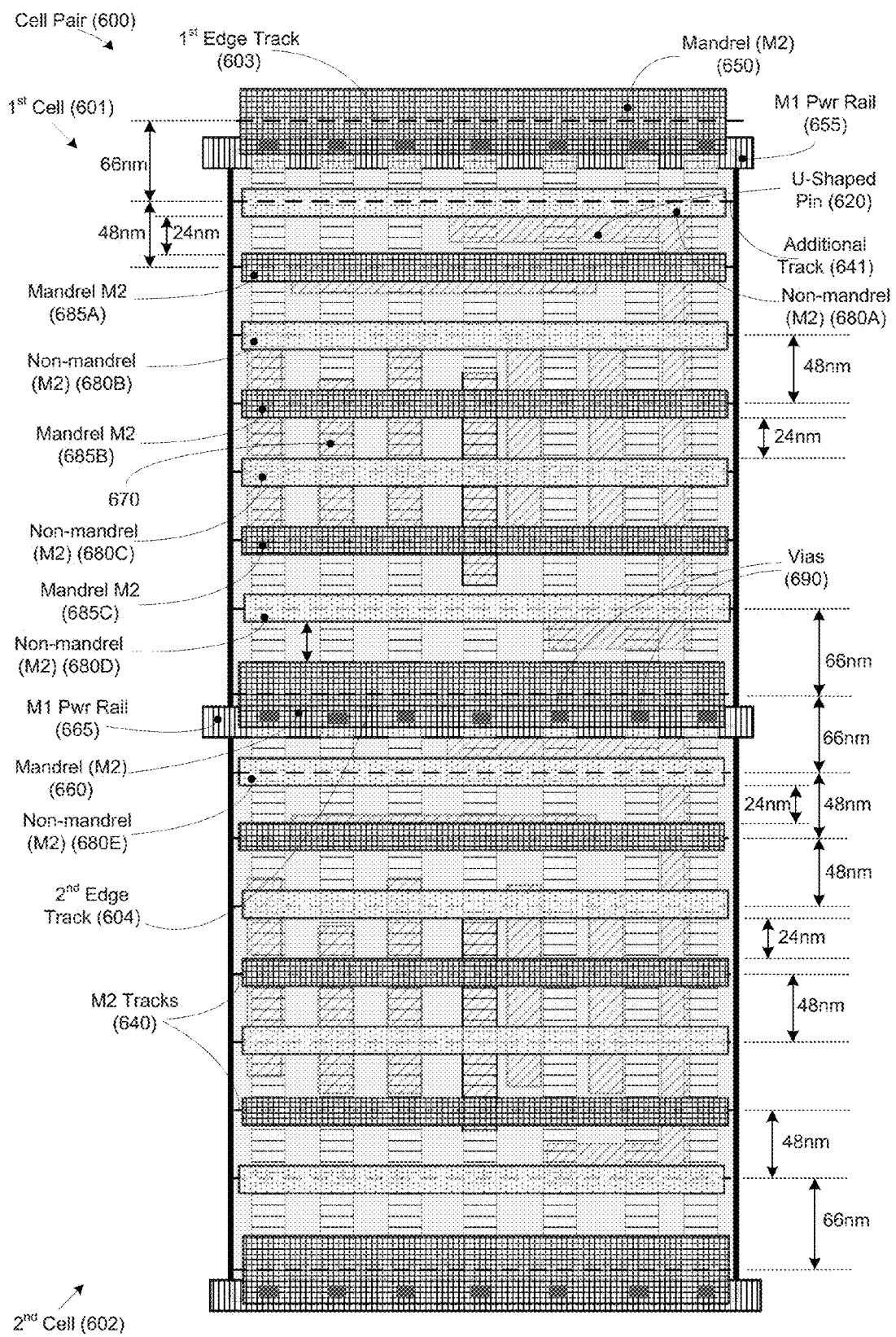
FIG. 6 illustrates a stylized depiction of a cell pair comprising offset power rails in accordance with embodiments herein.

Turning now to FIG. 6, a stylized depiction of a cell pair comprising offset power rails in accordance with embodiments herein, is illustrated. The cell pair 600 comprises two cells that are grouped together, a $1^{st}$ cell 601 and a $2^{nd}$ cell 602. In one embodiment, the cells 601, 602 are 10 nm, 8.75 T cells. Thus, on cell 601, there are seven horizontal routing tracks 670 and two edge tracks (1st edge track 603 and 2nd edge track 604), on which alternative mandrel metal formations are defined.

The cell 601 comprises power rails that are offset about the cell boundaries. Asymmetrically about the top cell boundary a wider-than-default mandrel M2 metal formation (650) may be defined. Similarly, asymmetrically about the bottom cell boundary, a mandrel M2 metal formation (660) is defined. The M2 metal formations may be wider-than-default metal formations, e.g., 60 nm in a 10 nm, 8.75 T functional cell library. The mandrel power rail 650 and the mandrel power rail 660 are respectively coupled a to VSS M1 power rail 655 and a VDD M1 power rail 665 using vias 690. There must be a minimum overlap between the M1 power rails 655, 665 and the M2 power rails 650, 660 in order to allow for vias 690 to interconnect these power rails.

As a result of the offset of the mandrel M2 metal 650, an additional routing track 641 is available in the cells 601, 602. As such, the mandrel M2 metal formation 650 is followed by a non-mandrel standard metal formation (e.g., 24 nm) 480A, followed by a mandrel metal 685A on the next track 670, followed by a non-mandrel metal 680B, followed by a mandrel M2 metal 685B, followed by a non-mandrel metal 680C, followed by a mandrel M2 metal 685C, followed by a non-mandrel M2 metal 685D on a subsequent track 640, and finally, on the 2nd edge track 604, a mandrel M2 power rail 660, which is defined asymmetrically about the bottom boundary, above a M1 power rail 665. Below the M2 power rail 660, on the next M2 track (in the 2nd cell 602), a non-mandrel M2 metal 680E is defined, and then alternating mandrel and non-mandrel metal formations are defined. In this manner, mandrel and non-mandrel M2 metal formations are alternated on the M2 tracks 640 and on the cell boundaries in order to avoid color mismatch errors. Further, as a result of the offsetting of the metal power rails 650, 660, an additional horizontal metal routing track 641 per cell is provided for use as additional routing resource.

The metal power rails 650, 660 are not symmetrical to the top/bottom cell boundaries, however, they are respectively symmetrical to the 1st edge track 603 and the 2nd edge track 604. In the example illustrated in FIG. 6, the distance between the 1st edge track 603 and the next adjacent M2 track 640 is 66 nm, wherein subsequent M2 tracks are 48 nm apart. Similarly, the 2nd edge track 604 is 66 nm from the next adjacent M2 track 640. More over, the standard metal formations are 24 nm wide and the wider-than-default metal formations (i.e., 650, 660) are about 60 nm wide. Those skilled in the art would appreciate that these dimensions are exemplary and they apply to 10 nm, 8.75 T design. However, other dimension for the components illustrated in FIG. 6 may be applied and still remain within the spirit and scope of the embodiments and claims provided herein.

In one embodiment, since the power rails 650 and 660 are not symmetrical on the cells boundaries, the power rails are not drawn or defined at the cell level. Therefore, in some embodiments, the power rails 650 and 660 are added during the post-placement process of a design process for designing an integrated circuit, at the block level. Further, utilizing the asymmetrical power rails concept of embodiments herein, the wider-than-default metal formations are always mandrel metal formations. This provides for improved mandrel printability at the cell boundaries. Embodiments disclosed herein may be implemented in finFET mandrel designs as well as for lithography-etch-lithography-etch (LELE) metal designs.

Figure 7:
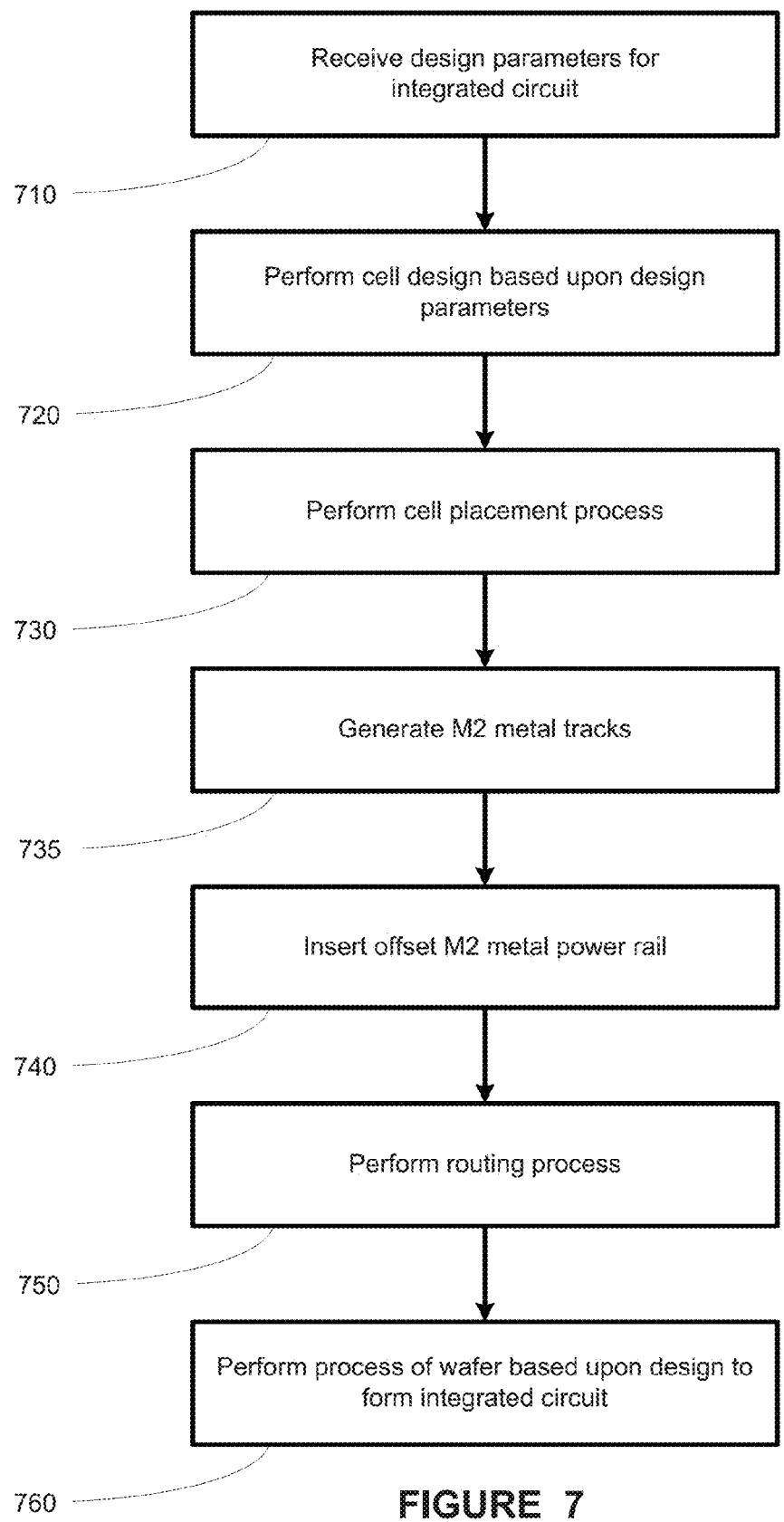
FIG. 7 illustrates a flowchart depiction of a method for providing a design comprising an offset metal formation, in accordance with embodiments herein.

Turning now to FIG. 7, a flowchart depiction of a method for providing a design comprising an offset metal formation, in accordance with embodiments herein is provided. A set of design parameters may be received (block 710). The design parameters may comprise various definitions for components (e.g., finFET devices) that are used to form functional cell and/or cell combinations for providing an integrated circuit. Based upon the parameters, one or more function cells may be provided.

In order to design the integrated circuit, a placement process may be performed (block 730). The placement process may include grouping a plurality of functional cells in the manner depicted in FIG. 6. Upon placement of the functional cells, a process of generating M2 metal tracks may be performed (block 735). For example, the M2 metal tracks 640 and the M2 edge tracks 603, 604 (see e.g., FIGS. 5 and 6) may be defined for a 10 nm, 8.75 T design. For example, the wider-than-default metal formations (i.e., M2 power rail) will be formed on an edge track, which may be defined as being 66 nm away from the adjacent M2 track. Other subsequent M2 tracks, on which default-width (e.g., 24 nm) metal are to be formed, may be spaced 48 nm from each other.

Upon placement of the functional cells and generating M2 metal tracks, metal formations that are offset/asymmetrical are placed on the top and bottom boundary track of each functional cell (block 740). In some embodiments, a wider-than-default metal formation is added to each boundary track in an offset manner such that additional space for one or more extra routing tracks may be provided. For example, in a 10 nm, 8.75 design, a VSS and a VDD metal power rails may be formed in an offset manner relative to another metal power rail in another layer, but on the boundary tracks of the functional cell. Further, the width of the metal power rails may be greater than 50 nm (e.g., 60 nm). Since the wider-than-default metal formations designed at the top and bottom boundaries of the cells are not symmetrical on the cell boundaries, these formations are not defined at the cell level. In one embodiment, the wider-than-default metal formations are added during the post-placement process of a design process at the block level.

Upon placing the wider-than-default metal formations, a routing process may be performed to route connection to the various components of the functional cells (block 750). Once the placement and routing processes are complete, the processing of semiconductor wafers may be performed based upon the definitions of the function cells (block 760). The process may provide integrated circuit devices that comprise devices (e.g., finFET devices) that comprise increased dense placement and routing of cell components. This may provide for integrated circuitry on wafers that have less process errors, are more dense, and thereby providing for small and more powerful semiconductor devices.

Figure 8:
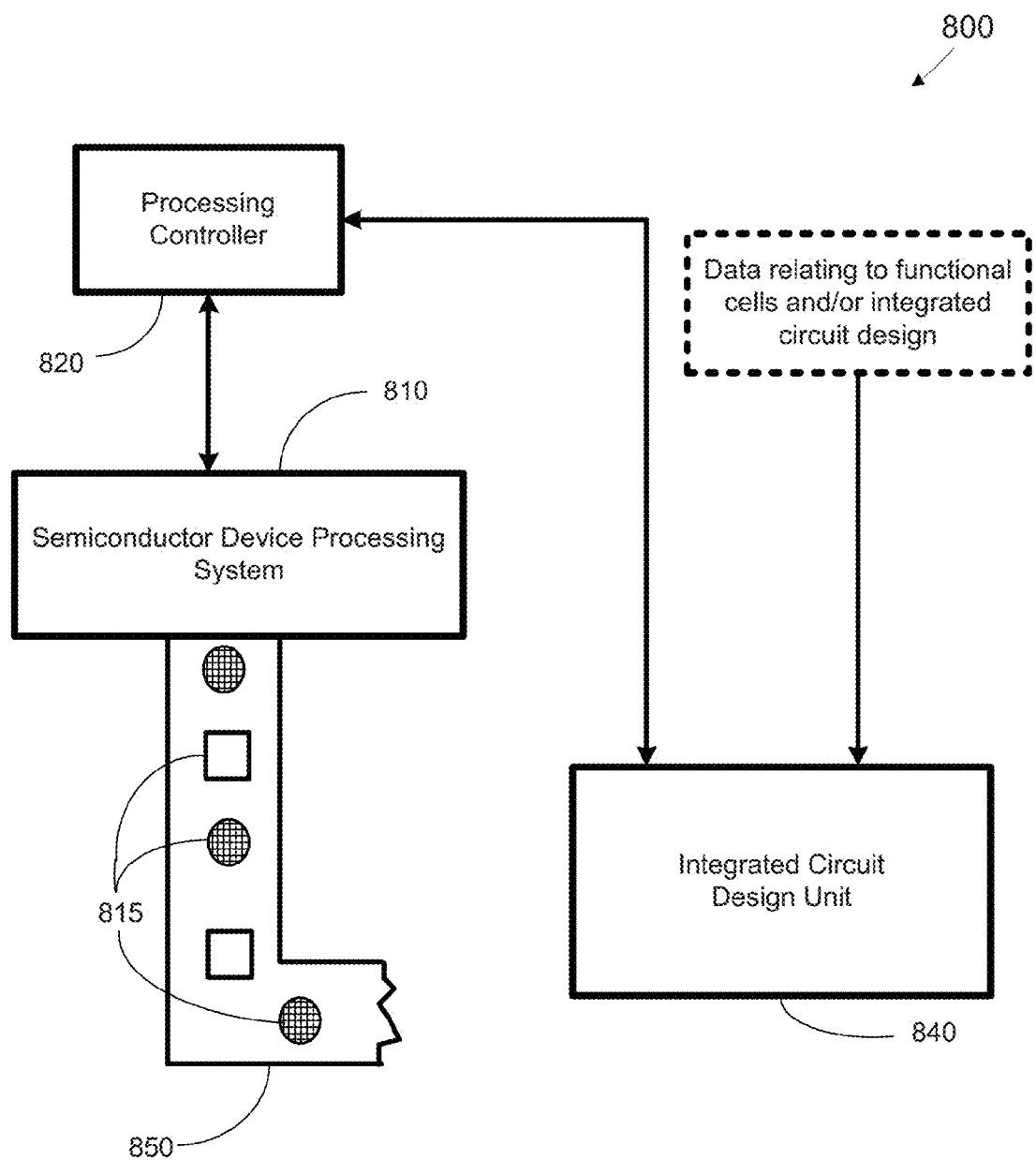
FIG. 8 illustrates semiconductor device processing system for performing a design process, in accordance with some embodiments herein.

Turning now to FIG. 8, a stylized depiction of a system for fabricating a semiconductor device package comprising a finFET device having an offset metal formation, in accordance with embodiments herein, is illustrated. The system 800 of FIG. 8 may comprise a semiconductor device processing system 810 and a design unit 840. The semiconductor device processing system 810 may manufacture integrated circuit devices based upon one or more designs provided by the design unit 840.

The semiconductor device processing system 810 may comprise various processing stations, such as etch process stations, photolithography process stations, CMP process stations, etc. One or more of the processing steps performed by the processing system 810 may be controlled by the processing controller 820. The processing controller 820 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 810 may produce integrated circuits on a medium, such as silicon wafers. The production of integrated circuits by the device processing system 810 may be based upon the circuit designs provided by the integrated circuits design unit 840. The processing system 810 may provide processed integrated circuits/devices 815 on a transport mechanism 850, such as a conveyor system. In some embodiments, the conveyor system may be sophisticated clean room transport systems that are capable of transporting semiconductor wafers. In one embodiment, the semiconductor device processing system 810 may comprise a plurality of processing steps, e.g., the $1^{st}$ process step, the $2^{nd}$ process set, etc., as described above.

In some embodiments, the items labeled "815" may represent individual wafers, and in other embodiments, the items 815 may represent a group of semiconductor wafers, e.g., a "lot" of semiconductor wafers. The integrated circuit or device 815 may be a transistor, a capacitor, a resistor, a memory cell, a processor, and/or the like. In one embodiment, the device 815 is a transistor and the dielectric layer is a gate insulation layer for the transistor.

The integrated circuit design unit 840 of the system 800 is capable of providing a circuit design that may be manufactured by the semiconductor processing system 810. The design unit 840 may receive data relating to the functional cells to utilize, as well as the design specifications for the integrated circuits to be designed. In one embodiment, the integrated circuit design unit 840 may comprise function cell designs that provide for offsetting one or more metal formations relative to the top and bottom tracks of a functional cell. In some embodiments, the integrated circuit design unit 840 may provide one or more prompts to a user regarding placing asymmetrically arranged, greater-than-default metal formations on cell boundaries, providing for additional routing resources.

In other embodiments, the integrated circuit design unit 840 may perform an automated determination of the offset dimension and automatically incorporate metal formation on cell combination that had placement process performed. For example, once a designer or a user of the integrated circuit design unit 840 generates a design using a graphical user interface to communicate with the integrated circuit design unit 840, the unit 840 may perform automated modification of the design using offset metal placement. In other embodiments, the integrated circuit design unit 840 may be capable of automatically generating one or more offset features for metal formation in cells, or retrieve data regarding the offset parameters from a library.

The system 400 may be capable of performing analysis and manufacturing of various products involving various technologies. For example, the system 800 may design and production data for manufacturing devices of CMOS technology, Flash technology, BiCMOS technology, power devices, memory devices (e.g., DRAM devices), NAND memory devices, and/or various other semiconductor technologies.

Although in some examples, circuits herein were described in terms of NMOS devices for consistency, those skilled in the art would appreciate that concepts described herein may also apply to PMOS devices and remain within the scope of embodiments herein.

The system 800 may be capable of manufacturing and testing various products that include transistors with active and inactive gates involving various technologies. For example, the system 400 may provide for manufacturing and testing products relating to CMOS technology, Flash technology, BiCMOS technology, power devices, memory devices (e.g., DRAM devices), NAND memory devices, processors, and/or various other semiconductor technologies.

The methods described above may be governed by instructions that are stored in a non-transitory computer readable storage medium and that are executed by, e.g., a processor in a computing device. Each of the operations described herein (e.g., FIGS. 7-8) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. A method for providing a layout for an integrated circuit device, comprising:
   receiving a design for an integrated circuit device, wherein said design comprises at least one functional cell;
   modifying said design to comprise a first metal formation placed asymmetrically about a first cell boundary of said functional cell for providing additional space for routing; and
   fabricating an integrated circuit device based on said modified design.

2. The method of claim 1, further comprising
   modifying said design to comprise a second metal formation placed asymmetrically about a second cell boundary of said functional cell for providing additional space for routing.

3. The method of claim 2, wherein modifying said design to comprise said second metal formation placed asymmetrically about said second cell boundary comprises placing said second metal formation in a similar offset fashion as a placement of said first metal formation.

4. The method of claim 2, wherein modifying said design to comprise said first and second metal formations comprises placing said first functional cell with a second functional cell and subsequently asymmetrically placing said first metal formation on said first cell boundary and said second metal formation on said second and second metal formation.

5. The method of claim 2, wherein modifying said design to comprise said first metal formation comprises modifying said design to comprise a mandrel metal Metal-2 (M2) layer and wherein modifying said design to comprise said second metal formation comprises modifying said design to comprise a mandrel metal Metal-2 (M2) layer.

6. The method of claim 2, wherein, in receiving said design for said integrated circuit device, said design comprises a functional cell comprise receiving a 10 nm design comprising a functional cell having at least one 10 nm component and wherein said functional cell has a 8.75 track design.

7. The method of claim 6, wherein modifying said design to comprise said first and second metal formations placed asymmetrically comprises placing said first and second asymmetrically relative to a first boundary track and a second boundary track of said functional cell to provide an extra metal routing track.

8. The method of claim 6, wherein said first metal formation comprises mandrel metal and a plurality of standard mandrel metal formations alternating with non-mandrel metal formations until the formation of the said second metal formation as a mandrel metal formation.

9. The method of claim 2, wherein said functional cell comprises a first metal-1 layer power rail operatively coupled to VDD signal and to said first metal formation and a second metal-1 layer power rail operatively coupled to a VSS signal and to said second metal formation.

10. A method for providing a layout for an integrated circuit device, comprising:
receiving a design for an integrated circuit device, wherein said design comprises at least a first functional cell and a second functional cell;
performing a placement process for placing said first and second functional cells based upon the design;
modifying said design to comprise a first metal formation placed asymmetrically about a first cell boundary of said first functional cell for providing additional space for routing;
modifying said design to comprise a second metal formation placed asymmetrically about a second cell boundary of said first functional cell for providing additional space for routing; and
fabricating an integrated circuit device based on said modified design.

11. The method of claim 10, wherein modifying said design to comprise said first metal formation comprises modifying said design to comprise a mandrel metal Metal-2 (M2) layer and wherein modifying said design to comprise said second metal formation comprises modifying said design to comprise a mandrel metal Metal-2 (M2) layer.

12. The method of claim 10, wherein receiving said design for said integrated circuit device comprises receiving a 10 nm design comprising a functional cell having at least one 10 nm component and wherein said functional cell has a 8.75 track design.

13. The method of claim 10, wherein said first metal formation comprises mandrel metal and a plurality of standard mandrel metal formations alternating with non-mandrel metal formations until the formation of the said second metal formation as a mandrel metal formation.

14. The method of claim 10, wherein performing said placement process comprises placing a plurality of metal pins and a U-shape metal formation and a plurality of vias for connecting said first metal formation to a first M1 metal layer and connecting said second metal formation to a second M1 metal formation.

15. The method of claim 14, wherein said functional cell comprises a first metal-1 layer power rail operatively coupled to VDD signal and to said first metal formation and a second metal-1 layer power rail operatively coupled to a VSS signal and to said second metal formation.

16. The method of claim 10, wherein modifying said design to comprise said first and second metal formations comprises performing a placing function of said first and second functional cells and placing said first and second metal formation during a block level placement process.

17. A system, comprising:
a design unit adapted to:
receive a design for an integrated circuit device, wherein said design comprises at least a first functional cell and a second functional cell;
perform a placement process for placing said first and second functional cells based upon the design;
modify said design to comprise at a first metal formation placed asymmetrically about a first cell boundary of said first functional cell for providing additional space for routing; and
modify said design to comprise at a second metal formation placed asymmetrically about a second cell boundary of said first functional cell for providing additional space for routing; and
a semiconductor device processing system for fabricating an integrated circuit device based upon said modified design; and
a processing controller operatively coupled to said semiconductor device processing system, said processing controller configured to control an operation of said semiconductor device processing system.

18. The system of claim 17, wherein said first metal formation is a mandrel metal Metal-2 (M2) layer and wherein said second metal formation for VSS is a mandrel metal Metal-2 (M2) layer for VDD.

19. The system of claim 17, wherein design unit is further configured to determine an amount of offset for placing said first and second metal formations to provide an additional routing track.

20. The system of claim 17, wherein said design for said integrated circuit is a 10 nm design comprising a functional cell having at least one 10 nm component and wherein said first and second functional cells each has a 8.75 track design.

* * * * *